Patented Feb. 27, 1934

1,949,360

UNITED STATES PATENT OFFICE 1,949,360

METHOD FOR MAKING ARTIFICIAL ZEOLITES

Arlie W. Schorger, Madison, Wis., assignor to C. F. Burgess Laboratories, Inc., Madison, Wis., a corporation of Delaware No Drawing. Application December 29, 1928
Serial No. 329,304

41 Claims. (Cl. 23—113)

My invention relates to a new method for making artificial zeolites or base-exchanging compounds.

The objects of my invention are to provide a base-exchanging compound which has a higher exchange capacity than those previously made and also to provide a more simple and a cheaper method for producing such a high capacity compound.

Base-exchanging compounds and especially the artificial zeolites have been made by mixing an alkaline solution of a metal, and especially an amphoteric metal such as aluminum, and a solution of an alkaline silicate such as sodium silicate, thereby forming a gel, and subsequently drying the gel to the correct moisture content. For water softening purposes the final product is usually granular. Many variations of the procedure have been patented and used. In some procedures the gel may occupy the entire volume of the solutions used and in some cases a portion of the excess water may be pressed out. In some cases the gel and the mother liquor are dried together and the mother liquor residues are then washed out. Various methods for washing have been devised. However, all of these methods previously used require that a large portion of excess water in the gel be removed by evaporation before the gel acquires the hardness and proper physical properties necessary for water-softening purposes.

I have discovered that it is possible to dispense almost entirely with the drying operation and instead to remove a portion or substantially all of the excess water by freezing. I thereby make a much more efficient base-exchanging mineral than has been heretofore produced. My estimates show that my method also effects a saving in production cost over the drying method.

In general I prefer to make a gel of a base-exchanging compound by the usual manner, that is, by mixing solutions of compounds which react to form gels of a base-exchanging substance. For the ordinary water-softening artificial zeolite it is a practice to use a mixture of an alkali solution of an amphoteric metal, such as sodium aluminate, and a solution of an alkaline silicate such as sodium silicate. These are mixed in the proper proportions and an aqueous gel, sometimes called a precipitate, is formed. This aqueous gel is then refrigerated at a temperature somewhat below the freezing point of water.

As a result of this freezing operation, a solid frozen mass may be formed which consists of particles of base-exchanging substance with a low water content, and ice which fills the spaces between these particles. The freezing of the excess water results in a shrinkage of the gel and the formation of particles of gel in which the water content has been greatly reduced. However, these gel particles may still retain, in unfrozen condition, water of hydration and capillary liquid, since the gel particles contain a mass of capillary passages. This capillary liquid, which may contain solutes, freezes at a much lower temperature than the excess water and I prefer not to lower the refrigeration temperature to the point where this capillary water or solution freezes. My experiments indicate that the freezing of the capillary liquid results in a shattering of the granules into a powder, which usually is not desirable. The excess water may also contain caustic soda or other electrolyte, resulting from the reaction.

When making a base-exchanging compound of silica, alumina, and soda, the frozen mass becomes translucent. Under certain conditions it becomes transparent. After the frozen mass is melted, the resulting product consists of the alkali water and a mass of firm granules of base-exchanging substance provided the frozen mass is made under properly controlled conditions. The alkali water is drained off of the granules and these are then washed to remove the excess alkali. The product is then usually dried by centrifuging to remove adhering solution. These particles may then be further dried to remove a small further amount of moisture to properly harden them to withstand mechanical abrasion. They may then be screened and sized.

The product obtained by this method has a high base exchange capacity. According to my tests I have found it to have a capacity of about twice that of the most efficient zeolite now on the market. I attribute this capacity to the high degree of capillarity of the particles resulting from the freezing operation.

The drying methods heretofore previously employed apparently seal some of the capillary openings of the gel particles and thereby cut down the exchange capacity.

By my method it is possible to regulate the size of the particles formed so that little crushing is necessary with consequent small loss in fines. It is preferable to have the granules coarser than 50 mesh. The refrigeration operation may be carried out at a lower cost than a drying operation to remove equal quantities of water.

Following is an example of how my process may be carried out by those skilled in the art. The proportions and strengths of the materials and the conditions may be varied over a wide range without departing from the scope of my invention:

An 0.715 molal solution of sodium aluminate with respect to the $Al_2O_3$ or 72.0 grams per kg. of solution, and a 1.0 molal solution of sodium silicate containing 60 grams of $SiO_2$ per kg. of solution are made up. The sodium silicate may be one in which the $Na_2O$ to $SiO_2$ ratio is about 1 to 2.85 though this composition may vary. About 1 part of the aluminate solution is mixed with 3 to 4 parts of the sodium silicate solution, preferably at a temperature of less than 5° C. This low temperature retards reaction and allows thorough mixing of the reacting solutions before gelation takes place. The mixed solution is preferably put in pans and allowed to gel in layers of uniform thickness of about 5 inches. The gel so formed contains large quantities of water although excess water is not visible. I therefore call such a gel an aqueous gel to distinguish it from the finished zeolite gel which also contains some water. The pans containing the gel or the liquid mixture which is capable of geling, are then subjected to refrigeration so that the temperature of the mixture finally drops to about —5° C., although this temperature may vary over a considerable range being preferably higher than —10° C. As previously stated the mixture may be frozen into a solid mass and then removed from the refrigerating chamber after it is converted into a translucent solid. The ice may be melted and the alkaline solution drained from the granules of gel. These granules may then be washed, preferably with a water containing some hardness, whereby a base exchange occurs, and then centrifuged and dried to about 50% water content to harden the particles. The thawing mass may be washed with water while thawing so that the thawing and washing operation are carried out simultaneously and quickly.

I have found that it is best not to disturb the gel after it is formed from the mixed reacting solutions. The structure or grain of the gel so formed seems to favor the production of a better product after freezing. The whole mass of a mixture of the reacting solutions may be frozen or it is possible to express some of the excess water from the gel prior to freezing. However, the product made after disturbing the original gel structure does not seem to give as good results as that made from an undisturbed gel. The size and physical properties of the granules depend on the composition of the gel, the handling of the gel, and the temperature at which it is refrigerated. If it is not frozen sufficiently it is too soft, and if it is refrigerated at too low a temperature it becomes too finely divided or powdery.

My method may be applied to base-exchanging compounds in general and is not confined to the compounds of aluminum, silica, and soda. Other amphoteric metals as well as such metals as molybdenum may replace the aluminum. For example, an ammonium molybdate solution, ammonia, and sodium silicate form a firm gel. I may take 12.65 parts of ammonium molybdate— $(NH_4)_6Mo_7O_{24}.4H_2O$ 87.35 parts of water and 13.5 parts of ammonium hydroxide solution (0.9 sp. gr.), mix the same with an equivalent amount of sodium silicate solution (1.075 sp. gr.) and thereby form a gel.

Gels have been formed using sodium tungstate and sodium silicate, and using potassium dichromate and sodium silicate, all of which are suitable for practice of the present invention.

While I have described but one method for carrying out my invention, it is to be understood that I do not wish to limit myself strictly to that method. I claim broadly the method of producing a base-exchanging compound by freezing a gel of such compound. I contemplate such variations in procedure as may lend themselves to the practical and commercial prosecution of my invention, such as the partial elimination by evaporation or otherwise of excess water from the gel prior to the freezing operation. I may also vary the ratio of sodium silicate to sodium aluminate and the ratios of $Na_2O$ to $SiO_2$ and $Na_2O$ to $Al_2O_3$ without departing from the spirit of my invention. Nor does the present invention contemplate the exclusion of other substances which may accidentally be present or which may be purposely added without rendering practice of the process impossible.

I claim:

1. The method of forming particles of base-exchanging compound which comprises making a mixture of water and soluble ingredients which together are capable of forming a gel of base-exchanging substance and freezing the resulting gel.

2. The method of forming particles of base-exchanging compound which comprises forming an aqueous gel of said compound, and then freezing said aqueous gel.

3. The method of making particles of base-exchanging compound which comprises forming an aqueous gel of said compound, freezing said aqueous gel, and then melting the ice formed.

4. The method of making a base-exchanging compound which comprises forming an aqueous gel of said compound, freezing said aqueous gel, melting the ice formed, and washing the particles of compound formed thereby.

5. The method of making particles of base-exchanging compound which comprises forming an aqueous gel of said compound, freezing said aqueous gel, melting the ice formed, washing the particles of compound formed thereby, and drying said washed particles.

6. The method of making granular particles of base-exchanging compound which comprises forming an aqueous gel of said compound, and freezing said aqueous gel at a temperature high enough to avoid the formation of a powdery product.

7. The method of making a base-exchanging compound which comprises forming an aqueous gel from a mixture of solutions of sodium silicate and sodium aluminate, freezing said aqueous gel so formed, and melting the ice formed during said freezing operation.

8. The method of making a base-exchanging compound which comprises refrigerating a mixture of solutions of sodium silicate and sodium aluminate until a translucent frozen mass is formed, and melting the ice formed.

9. The method of making a granular base-exchanging compound which comprises freezing a mixture of solutions of sodium silicate and sodium aluminate at a temperature high enough to avoid the formation of a powdery product.

10. The method of making a base-exchanging compound which comprises forming an aqueous gel from a mixture of solutions of sodium silicate and sodium aluminate, refrigerating the aqueous gel so formed without disturbing the gel structure formed during gelation until excess water therein is frozen, and melting the ice formed.

11. The method of forming particles of a base-exchanging compound which comprises freezing out excess water in the gel formed by a mixture of solutions of sodium silicate and sodium aluminate.

12. The method of forming particles of a base-exchanging compound which comprises freezing out excess water in the gel formed by a mixture of solutions of sodium silicate and sodium aluminate and then simultaneously melting the ice and washing the gel particles.

13. The method of forming a granular base-exchanging compound which comprises freezing at a temperature above $-10°$ C., the gel formed by a mixture of solutions of sodium silicate and sodium aluminate and melting the ice formed.

14. The method of forming particles of base-exchanging compound which comprises freezing the gel formed by a mixture of solutions in the proportion of about 1 part of a sodium aluminate solution containing 72.0 grams of $Al_2O_3$ per kg. of solution to about 3 to 4 parts of a sodium silicate solution containing 60 grams of $SiO_2$ per kg. of solution, and melting the ice formed.

15. The method of forming a granular base-exchanging compound which comprises freezing at a temperature above $-10°$ C., the gel formed by a mixture of solutions in the proportion of about 1 part of a sodium aluminate solution containing 72.0 grams of $Al_2O_3$ per kg. of solution, to about 3 to 4 parts of a sodium silicate solution containing 60 grams of $SiO_2$ per kg. of solution, and melting the ice formed.

16. The method of forming a granular base-exchanging compound which comprises mixing solutions of sodium aluminate and sodium silicate at a temperature of not over 5° C., refrigerating the undisturbed gel formed thereby at a temperature above $-10°$ C. to form ice, and melting the ice formed.

17. The method for removing excess alkaline liquid from the mass of a mixture of solutions of sodium silicate and sodium aluminate which comprises refrigerating said mass of gel until excess water freezes, melting the ice thus formed, and draining liquid from the gel particles formed during the refrigerating operation.

18. The process for preparing base exchange substances which includes forming a gel of hydrated alumino-silicate, freezing said gel to form a solid frozen mass, and thawing said mass at a temperature below the boiling point of water, whereby the mother liquor may be drained from the solid base exchange substance.

19. The process of preparing base exchange substances which includes forming a gel of hydrated alumino-silicate, freezing said gel to form a solid frozen mass, thawing said mass at a temperature below the boiling point of water, draining the mother liquor from the base exchange substance thus formed, and washing the substance to reduce the alkalinity thereof.

20. The process of preparing base exchange substances which includes causing a solution of sodium silicate and a solution of sodium aluminate to react and form a gel, freezing said gel to form a solid frozen mass, thawing said mass at a temperature below the boiling point of water, draining the melted mother liquor from the base exchange substance thus formed, and washing the substance to remove the alkalinity thereof.

21. The process of preparing base exchange substances which includes forming a gel of hydrated alumino-silicate, separating a portion of the mother liquor from said gel, freezing said gel to form a solid frozen mass, thawing said mass at a temperature below the boiling point of water, draining the melted mother liquor from the base exchange substance thus formed, and washing the substance to reduce the alkalinity thereof.

22. The process of preparing base exchange substances which includes causing solutions of sodium silicate and sodium aluminate, in concentration dependent upon the particle size desired, to react to form a gel of jelly-like consistency, breaking up the jelly to cause a portion of the mother liquor to be liberated therefrom, filter-pressing the gel to separate the liberated mother liquor, freezing the remaining gel to form a solid frozen mass, thawing said mass at a temperature below the boiling point of water, draining the melted mother liquor from the base exchange substance thus formed, and washing the substance to reduce the alkalinity thereof.

23. The process of preparing base exchange substances which includes causing solutions of sodium silicate and sodium aluminate, in concentration dependent upon the particle size desired, to react to form a gel of jelly-like consistency, breaking up the jelly to cause a portion of the mother liquor to be liberated therefrom, filter-pressing the gel to separate the liberated mother liquor, freezing the remaining gel to form a solid frozen mass, thawing said mass at a temperature below the boiling point of water, draining the melted mother liquor from the base exchange substance thus formed, partially drying the base exchange substance at a temperature below the boiling point of water, and washing the substance to reduce the alkalinity thereof.

24. The method of producing particles of a base exchanging silicate comprising forming an aqueous gel of said silicate, freezing said gel to produce a frozen mass containing particles of base exchanging silicate and ice, and thawing said mass to free the granular particles from the ice.

25. The method of producing particles of a zeolitic base exchanging silicate comprising forming an aqueous gel of said silicate, freezing said gel to produce a frozen mass containing particles of base exchanging silicate and ice, thawing said mass to free the particles from the ice and further indurating said particles.

26. As a new article of manufacture, a base-exchanging compound which has been produced from the frozen aqueous gel of said compound.

27. As a new article of manufacture, a base-exchanging compound which has been produced from the frozen aqueous gel of a mixture of an alkali silicate and an alkaline solution of an amphoteric oxide.

28. As a new article of manufacture, a base-exchanging compound which has been produced from the frozen aqueous gel of a mixture of sodium silicate and sodium aluminate.

29. As a new article of manufacture, a base-exchanging compound resulting from the frozen aqueous gel of a mixture of sodium silicate and sodium aluminate, said mixture being undisturbed after gelation takes place and during refrigeration.

30. As a new article of manufacture, a granular base-exchanging compound resulting from the freezing out of excess water in an aqueous gel of said compound.

31. As a new article of manufacture, a granular base-exchanging compound resulting from the freezing out of excess water in a gel of a mixture of solutions of sodium aluminate and sodium silicate.

32. As a new product, a frozen solid mass, comprising an intimate mixture of particles of ice and particles of a gel of a base-exchanging compound, said frozen mass resulting from the freezing of a gel of said compound.

33. As a new product, a frozen solid mass, comprising an intimate mixture of particles of ice and particles of a gel of a base-exchanging compound, said frozen mass resulting from the freezing out of excess water in a gel of said compound.

34. As a new product, a frozen solid mass, comprising an intimate mixture of particles of ice and particles of a gel of a compound of alumina, silica, and an alkali, said frozen mass resulting from the freezing out of excess water in a gel of said compound.

35. As a new product, a frozen solid mass, comprising an intimate mixture of particles of ice and particles of a gel of a compound of alumina, silica, and an alkali, said frozen mass resulting from the freezing out of excess water in an undisturbed gel of a mixture of solutions of alkali aluminate and alkali silicate.

36. A base exchange substance composed of co-precipitated alkali metal aluminate and silicate, having an exchange capacity in excess of 20,000 grains per cubic foot and the properties of a hydrated alumino-silicate separated from a gel thereof by freezing.

37. A base exchange substance composed of co-precipitated alkali metal aluminate and silicate, having an exchange capacity between 20,000 and 26,000 grains per cubic foot and the properties of a hydrated alumino-silicate separated from a gel thereof by freezing.

38. A base exchange substance composed of a hydrated alumino-silicate in hard, rigid gel granules produced by freezing and thawing a wet gel formed from alkali silicate and alkali aluminate and having a base exchange capacity in excess of 20,000 grains per cubic foot of said granules.

39. The method of producing particles of a zeolitic base exchanging silicate comprising forming an aqueous gel of said silicate, freezing said gel to produce a solid frozen mass containing particles of base exchanging silicate and ice, and thawing said mass to free the particles from the ice.

40. The method of producing particles of a base exchanging silicate comprising forming an aqueous gel of said silicate, freezing said gel to produce a frozen mass containing granular particles of base exchanging silicate and ice, thawing said mass to free the granular particles from the ice, and further indurating said particles.

41. The method of making a base exchanging silicate comprising forming an aqueous gel of said silicate, freezing the so-formed aqueous gel without disturbing the gel structure formed during gelation until the excess water therein is frozen, and thawing the resulting mass to free the particles from the ice.

ARLIE W. SCHORGER.